(12) United States Patent
Akiyama

(10) Patent No.: US 6,880,603 B2
(45) Date of Patent: Apr. 19, 2005

(54) TIRE BUILDING DRUM

(75) Inventor: Naruhiro Akiyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 138 days.

(21) Appl. No.: 10/232,616

(22) Filed: Sep. 3, 2002

(65) Prior Publication Data

US 2003/0047284 A1 Mar. 13, 2003

(30) Foreign Application Priority Data

Sep. 12, 2001 (JP) ........................................ 2001-275866

(51) Int. Cl.[7] .............................................. B29D 30/24
(52) U.S. Cl. ...................... 156/402; 156/400; 156/415; 156/420
(58) Field of Search ................. 156/415, 416, 156/417, 420, 400, 401, 402, 414

(56) References Cited

U.S. PATENT DOCUMENTS

| | | | |
|---|---|---|---|
| 3,867,231 A | * 2/1975 | Casey | ........................ 156/415 |
| 4,007,081 A | 2/1977 | Mallory | |
| 4,010,058 A | * 3/1977 | Kubinski et al. | ........... 156/415 |
| 5,164,035 A | 11/1992 | Nakajima et al. | |
| 6,318,434 B1 | * 11/2001 | Gutknecht et al. | ........... 156/402 |
| 6,640,863 B1 | * 11/2003 | Terazono | ..................... 156/402 |
| 2002/0104620 A1 | 8/2002 | Sala | |

FOREIGN PATENT DOCUMENTS

| | | |
|---|---|---|
| EP | 0 661 151 A2 | 12/1994 |
| FR | 2 093 180 A | 1/1972 |
| JP | A 8-11239 | 1/1996 |
| WO | WO 01/08874 A | 2/2001 |

* cited by examiner

Primary Examiner—Geoffrey L. Knable
(74) Attorney, Agent, or Firm—Oliff & Berridge, PLC

(57) ABSTRACT

A tire building drum includes a hollow main shaft, a pair of bead lock sections arranged concentric with the main shaft and respectively holding a bead core of a tire, and a radially expansible/contractible carcass-supporting body defining an inner shape of a carcass member extending between the bead cores. The carcass-supporting body is composed of a pair of core bodies which are concentric with the main shaft and have a plurality of expansible/contractible rigid segments circumferentially abutting on and engaging with each other. The tire building drum is provided with a pair of sliders on which the core body and the bead lock section are mounted on a single side in the axial direction, slider-moving means for moving these sliders to any required radial position and segment-expanding/contracting means for expanding/contacting the segments of each core body to any required radial position.

6 Claims, 8 Drawing Sheets

TIRE BUILDING DRUM

BACKGROUND OF THE INVENTION

1. Field of the Invention

The present invention relates to a tire building drum for building a green tire from a green case or a carcass band composed of members including a carcass member of a tire.

2. Description of the Related Art

In a green tire building process, a cylindrical carcass band or green case is generally built on a first building drum, a cylindrical belt tread band is built on a second building drum by bonding a belt member with a tread rubber, and then the cylindrical carcass and the cylindrical belt tread band are respectively transferred onto a green tire building drum. Subsequently, while holding both bead cores of the carcass band or the green case in place, the main body of the carcass member extending between the bead cores is swelled radially outwards to contact a cylindrical inner side of the belt tread band placed outside thereof, so that the main body and the belt tread band are tightly attached to each other by pressure.

A green tire building apparatus for use in such a process has a pair of bead lock sections for holding both bead cores, and a center bladder for sealing spaces defined between the bead lock sections, wherein the center bladder is entirely made of rubber. The main body of the carcass member can be toroidally swelled radially outwards by pressurizing the center bladder and thereby applying inner pressure to the space.

In this building process, the rubber bladder is assigned primarily with a sealing function, so that the main body of the carcass member itself is designed to support the inner pressure and determine the shape of the swelled main body of the carcass member. While this process is widely used due to its advantage in terms of cost, which results from use of the rubber bladder, there is a potential problem that the uniformity of the product tire tends to deteriorate if any portion with uneven strength is present in the main body of the carcass member such that the main body of the carcass member assumes uneven shape when it is swelled.

For improving the uniformity of the product tire, it is important to ensure that the main body of the carcass member has a swelled shape that is as close to the shape of the product tire as possible, already at the green tire building stage so as to minimize deformation of the green tire during vulcanization. However, this is practically difficult to realize by the above-mentioned prior art process, since the swelled shape is uniquely determined by the strength distribution in the main body of the carcass member.

In order to address such a problem, JP-A-8-011239 proposes a method wherein the building drum has a center bladder embedded with cords, so as to determine the swelled shape of the main body of the carcass member by applying tension to the cords. An additional or alternative measure is proposed in EP-A-0661151 or U.S. Pat. No. 5,164,035, for example, wherein a building drum is provided, instead of, or in addition to the center bladder, with a plurality of rigid bodies in the form of metal segments abutting on each other in the circumferential direction and made radially expandable/contractible so as to determine the swelled shape of the carcass member when expanded.

These known tire building drums can accurately realize a desired swelled shape of the main body of the carcass member, which is nearly the same as the product tire so as to advantageously improve the uniformity of the latter. From practical viewpoint, however, there is a problem that the prior art processes as mentioned above are not very suitable for continuously building tires in various dimensions with a single tire building drum. That is, for a production of tires having various dimensions with known tire building drums, it is necessary to frequently replace the building drum or the segment of the drum. Since these replacements are time-consuming, the known tire building drums are practically applicable only to a batch production in a large lot, which requires few dimensional changes. As a result, a large amount of intermediate stock have to be carried and stored, which result in disadvantages in both space and cost. Therefore, in order to overcome these problems, it would be desirable to provide a tire building drum capable of various dimensions, namely, a tire building drum which can continuously produce tires in various dimensions with a desired sequence, without replacing its parts.

DISCLOSURE OF THE INVENTION

The present invention has been achieved taking these problems into consideration and it is an object of the present invention to provide a green tire building drum including a plurality of expansible/contractible rigid segments and being capable of continuously building tires in various dimension with a desired sequence.

According to the present invention, there is provided a tire building drum including a hollow main shaft, a pair of bead lock sections arranged concentric with the main shaft and respectively holding a bead core of a tire, and a radially expansible/contractible carcass-supporting body defining a inner shape of a carcass member extending between the bead cores, the tire building drum comprising a pair of core bodies concentric with the main shaft, the pair of core bodies constituting the carcass-supporting body and comprising a plurality of expansible/contractible rigid segments circumferentially abutting on and engaging with each other, a pair of sliders on which the core body and the bead lock section are mounted on a single side in the axial direction, the sliders being movable toward and away from each other in the axial direction, slider-moving means for moving these sliders to any required radial position, and segment-expanding/contracting means for expanding/contracting the segments of each core body to any required radial position.

In the tire building drum according to the invention, the tire carcass-supporting body is composed of the core bodies arranged on the both sides of the main shaft, and there are provided the pair of sliders which is equipped with these core bodies and the bead lock sections and move toward or away from each other in the axial direction, and the slider-moving means for moving these sliders to and stopping at any required radial position. Therefore, a green tire having any bead core distance and belt members of any width can be built without replacing any part including a segment.

In addition, each of the core bodies on the both sides is composed of the plurality of expansible/contractible segments circumferentially abutting on and engaged with each other, and there are provided on the both sides the segment-expanding/contracting means for radially expanding the segments to and stopped at any diameter. Therefore, a green tire having belt members of any inner diameter can be built without replacing any part including a segment.

Further, in the tire building drum, the carcass-supporting body is composed of the plurality of rigid segments, and these segments are engaged with and abutted on each other at any diameter. Therefore, when the main body of the carcass member is radially expanded, a supporting face which uniformly supports the main body over the whole surface in width and circumferential directions and has high rigidity can be formed to realize a swelled shape of the carcass member highly accurately. Thus, a tire having satisfactory uniformity can be build.

Moreover, the radially expanded main body of the carcass member is supported by a face having high rigidity, so that the belt members and the tread rubber can be directly and accurately bonded on the circumference of the main body. According to a method using a conventional drum composed of a less rigid material such as a rubber bladder, since a sufficient accuracy cannot be ensured if the belt members and the tread rubber is directly bonded above the drum, a belt tread band is built on another drum and then transferred to be joined with the carcass member. As compared with the conventional method, the method using the tire building drum according to the present invention eliminates fluctuation in accuracy of the position during the transfer, and thus contributes to improve the uniformity.

Preferably, the slider-moving means comprises a screw shaft provided in the hollow main shaft, and the screw shaft comprises a slider-driving connector joined to an output shaft of a servo motor, and a pair of thread sections screwed into the sliders and having mutually opposite leads. In this instance, the pair of sliders being movable toward and away from each other are driven by screwing into the pair to the thread sections provided in a screw shaft and having mutually opposite leads, so that the sliders can be moved axially symmetric to each other in any situation. Therefore, regardless of dimension of a tire to be built, the center point of the sliders never shifts during both the expansion and the contraction of the drum, and thus the tire can be built highly accurately.

Further, the screw shaft is provided with the slider-driving connector driven by the servo motor, so that a dimensional change of the drum can be instantly conducted by setting preset values for each dimension which correspond to the stopping positions of the sliders and determine positions of a controller of the building apparatus to stop the servo motor, and selecting the preset value according to the dimension of a tire to be built. Therefore, tires in various dimensions can be continuously built with satisfactory productivity.

Moreover, since the screw shaft is provided in the hollow main shaft, the drum can be compactly configured.

Preferably, the segment-expanding/contracting means comprises segment-expanding/contracting link sections joined to the segments, a segment-driving connector joined to a driving arm axially reciprocated by a servo motor, an axially movable segment-binding section for coupling the segment-expanding/contracting link sections to the segment-driving connector, and a break for breaking the segment-binding section. In this instance, the pair of segment-expanding/contracting means are provided with the segment-expanding/contracting link sections joined to the segment, and the axially movable segment-binding section for coupling the segment-expanding/contracting link sections, so that the segments can be uniformly expanded or contracted over the whole circumference by moving the segment-expanding/contracting link sections in the axial direction. Therefore, the segments can be uniformly arranged on the circumference of a tire having any belt member-bonding diameter, so that a tire having good uniformity can be built.

Moreover, the segment-expanding/contracting means is provided with the segment-driving connector joined to a driving arm axially reciprocated by a servo motor, so that a dimensional change of the drum can be instantly conducted by setting preset values for each dimension which correspond to the stopping positions of expanding/contracting segments and determine positions of a controller of the building apparatus to stop the servo motor, and selecting the preset value according to the dimension of a tire to be built. Therefore, tires in various dimensions can be continuously built.

Further, the segment-expanding/contracting means of the tire building drum is provided with a break for breaking the segment-binding section, so that accuracy in the stopping position can be improved. In addition, although a centripetal force radially contracting the segments acts when a tension is applied to the belt members and the belt members are bonded on the outer periphery of the carcass member, a movement of the segment in the contracting direction accompanying to this can be prevented. When a center bladder is arranged on the outer circumference of the segments, a contractive force of the center bladder composed of a elastically deformable body similarly acts, so that the movement of the segment in the contracting direction can be also prevented in this case.

Preferably, the bead lock sections each comprises a plurality of bead lock segments circumferentially abutting on each other and being radially expansible or contractible while maintaining their circular spatial relations, bead lock expanding/contacting link sections joined to the bead lock segments, axially movable bead lock binding sections joined to these link sections, and a bead lock cylinder for moving the bead lock binding sections. In this instance, since all the bead lock segments can be expanded or contacted by moving the bead lock binding section in the axial direction, the bead cores can be uniformly held over the whole circumference. Further, since the bead lock segments are driven by the mounted bead lock cylinder, the building drum can be compactly configured.

Preferably, the fire building drum further comprises a center bladder comprising an elastically deformable body for sealing spaces between the sliders including the core body, the bladder having both axial ends mounted to the sliders.

Since the building drum is provided with the center bladder radially outside the segment, the tensioned center bladder smoothly fill the spaces between the segments on the outer periphery face of the segments formed by linking all the segments during the expansion of the segments. Therefore, the main body of the carcass member is more uniformly supported and a bonding face can be more uniformly configured when the main body is radially expanded and the belt members are bonded thereon.

In the case where the bead cores are held, the carcass member is turned up about the bead cores to form a green case and, thereafter, the green case is transferred onto another drum, it is necessary to release the held bead cores once and then hold the bead cores again. In this case, when the bead cores are held again, a deformation occurs due to a remaining stress around the bead core accompanying to turning up. As a result, it is difficult to hold the bead core again while precisely maintaining the original state.

To solve this drawback, it is preferred that the tire building drum further comprises turn-up mechanisms for turning side portions of the carcass member up about the respective bead cores, the turn-up mechanisms being mounted on each of the sliders.

Since the tire building drum is provided with the turn-up mechanisms, a so-called "carcass bands" which is a carcass member prior to turn up about the bead core can be transferred onto the green tire building drum and subsequently be turn up on the drum. Although a similar remaining stress occurs around the bead core when the carcass band is turned up, a green tire is built by continuously joining the belt members and the tread rubber while locking the bead core, so that the bead core is not held again until the green tire building is completed. Thus, a tire having a high degree of accuracy can be built.

Preferably, the turn-up mechanisms each comprises a plurality of turn-up rollers circumferentially abutting on each other and being radially expansible or contractible while maintaining their circular spatial relations, an external roller-driving contact section that can be reciprocated by contacting an axially reciprocating external driving arm, and rigid turn-up fingers, the fingers each having one end connected to the turn-up roller and the other end pivotly connected to the external roller-driving contact section. In this instance, the turn-up mechanisms are provided with the plurality of the turn-up rollers circumferentially abutting on each other and turning the up carcass member by moving the outside of the carcass member from the vicinity of the bead core to the edge of the carcass member, the rigid turn-up fingers each supporting the rollers, and the external roller-driving contact section pivotly connecting these turn-up fingers in a swingable manner to bind them. Therefore, as compared with a method in which the turning up is conducted by means of the turn-up bladder composed of an elastically deformable body, since the carcass member is turned up by moving the external roller-driving contact section toward the center of the axial, the turning up can be uniformly performed in the circumferential direction. Thus, a tire having satisfactory uniformity can be built

BRIEF DESCRIPTION OF THE DRAWINGS

For a better understanding of the invention, reference is made to the accompanying drawings, wherein.

DETAILED DESCRIPTION OF THE PREFERRED EMBODIMENT

Figure 1:
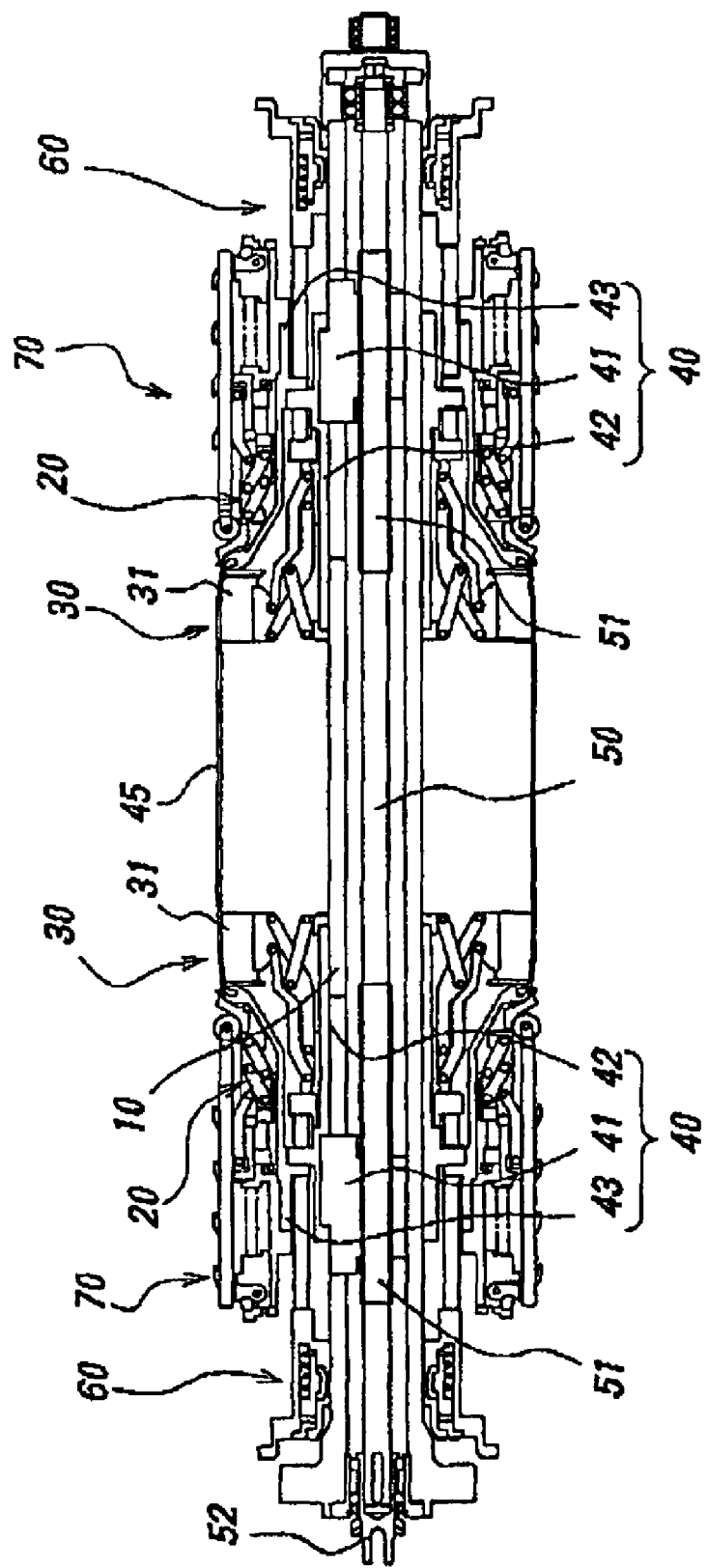
FIG. 1 is a partially sectional front view of a tire building drum according to the present invention.

Hereinafter, embodiments of the present invention will be described with reference to FIGS. 1 to 10. FIG. 1 is a sectional view of a tire building drum 1 according to an embodiment of the present invention. The tire building drum 1 has a hollow main shaft 10, bead lock sections 20 arranged concentric with the main shaft 10 on the left and right sides and respectively holding a bead core of a tire, a pair of core bodies 30 on the left and right sides composed of a plurality of rigid segments 31 radially expanding/contracting with the main shaft 10 as center, and sliders 40 having the bead lock sections 20 and the core bodies 30 of the same side and moving toward and away from each other in the axial direction.

The tire building drum 1 farther include a screw shaft 50 provided in the hollow section of the main shaft 10 and constituting a slider-moving means for moving the sliders 40, a pair of segment-expanding/contracting means for expanding/contracting the segments 31 arranged on the left side or the right side corresponding to the respective core bodies 30, and a pair of turn-up mechanism on the left and right sides for turning side portions of the carcass member up about the respective bead cores.

Figure 6:
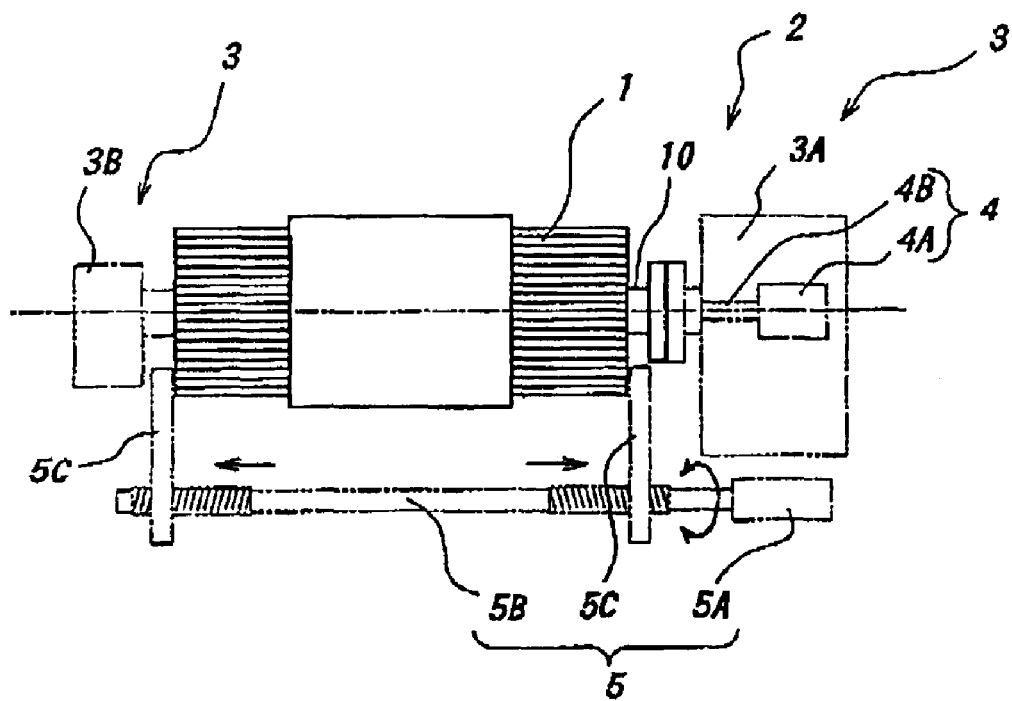
FIG. 6 is a schematic layout diagram showing a connection of the tire building drum and a building apparatus.

Now, a connection of the tire building drum 1 and a tire building apparatus 2 supporting and driving the tire building drum 1 is described with reference to a schematic layout diagram of the tire building apparatus shown in FIG. 6. The tire building apparatus 2 has a building apparatus main body 3A fastened to one end of the main shaft 10 of the tire building drum 1 and driving the main shaft 10, and a supporting section 3B for supporting the other end of the main shaft 10 opposed to the main body 3A to form a dual supporting in cooperation with the main body 3A. The building apparatus 2 also has a slider-driving section 4 composed of an external shaft 4B connected to the screw shaft 50 of the building drum 1 and a servo motor 4A for rotating the screw shaft 50 via the external shaft 4B, and a reciprocally driving section 5 composed of a servo motor 5A for a reciprocating drive, left and right threads 5B driven by the servo motor 5A, and a pair of driving arms 5C screwed on the threads 5B and respectively moving to the left or the right in the same distance. The reciprocally driving section 5 can be engaged with segment-expanding/contracting means 60 to drive them, or can be abut against a turn-up mechanisms 70 to actuate them.

Next, principal sections constituting the tire building drum 1 are described. As shown in FIG. 1, the screw shaft 50 for moving the sliders 40 has a pair of thread sections 51 on the left and right sides with mutually opposite leads, and a slider-driving connector 52 joining the screw shaft 50 to the external shaft 4B driven by the servo motor 4A for rotation.

Each of the sliders 40 is composed of a thread block 41 screwed on the thread section 51 located on the same side as the slider 40, a slider guide section 42 fixed on the thread block 41, guided by the main shaft 11 and sliding on the main shaft 11 in the axial direction, and a bead lock section-supporting section 43 fixedly mounted on the slider guide section 42 and extending radially outside of the slider guide section 42. The thread blocks 41 each screwed on the thread section 51 is mutually oppositely moved in the axial direction and in the same distance by externally rotating the screw shaft 50 via the slider-driving connector 52, so that each of the sliders 40 can be entirely moved toward and away from each other.

As mentioned above, both of the sliders 40 are mutually oppositelly moved in the axis direction and exactly in the same distances by the rotation of the screw shaft 50. Therefore, when the main body of the carcass member is swelled while maintaining a cord path length extending between the bead cores, pushing the bead lock section 20 and the core body 30 toward the center, which is so called width-approaching, in sync with the radial expansion of the segments 31 can be conducted at a high degree of accuracy. Moreover, since the slider 40 is driven by the external servo motor 4A via the screw shaft 50, the slider can stop at any axial position. Therefore, tires being different in length of the carcass cord between the bead cores, or tires being different in the width of the belt members can be continuously built without replacing the parts of the drum.

A center bladder 45 for sealing spaces separated by the slider 40 is provided between the left and right sliders. Both side ends of the center bladder 45 are circularly attached to axially central side ends of the bead lock section-supporting sections 43 of the sliders 40. The center bladder 45 fills spaces between the segments 31 on the outer periphery face of the segments 31 during the segment 31 being radially expanded in a state where tension is applied to the center bladder 45. Therefore, the main body of the carcass member is more uniformly supported and a bonding face can be more uniformly configured when the belt members are bonded on the center bladder 45, which may contribute to improve the uniformity.

Figure 2:
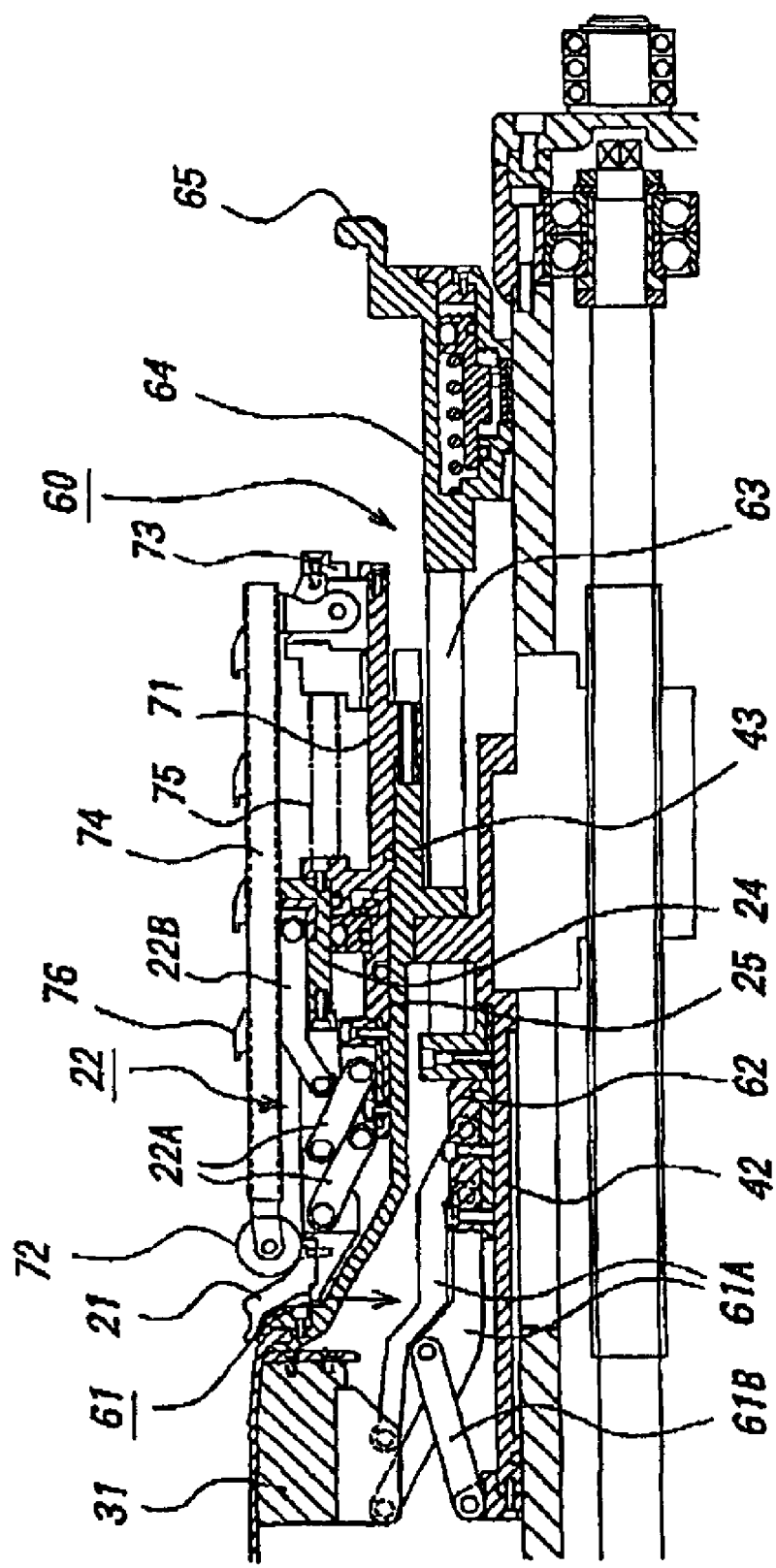
FIG. 2 is a partially sectional fragmentary detail view of a tire building drum according to the present invention.
Figure 3:
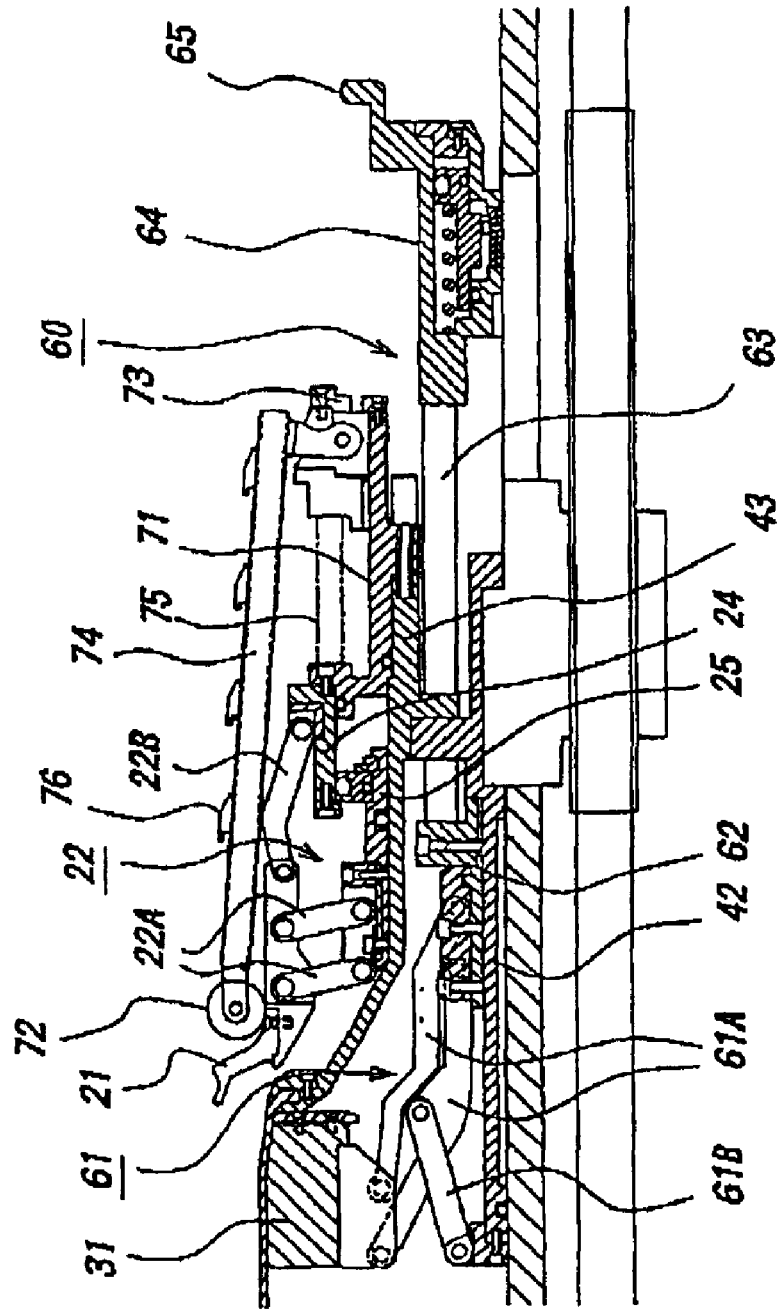
FIG. 3 is a partially sectional fragmentary detail view of a tire building drum according to the present invention.
Figure 4:
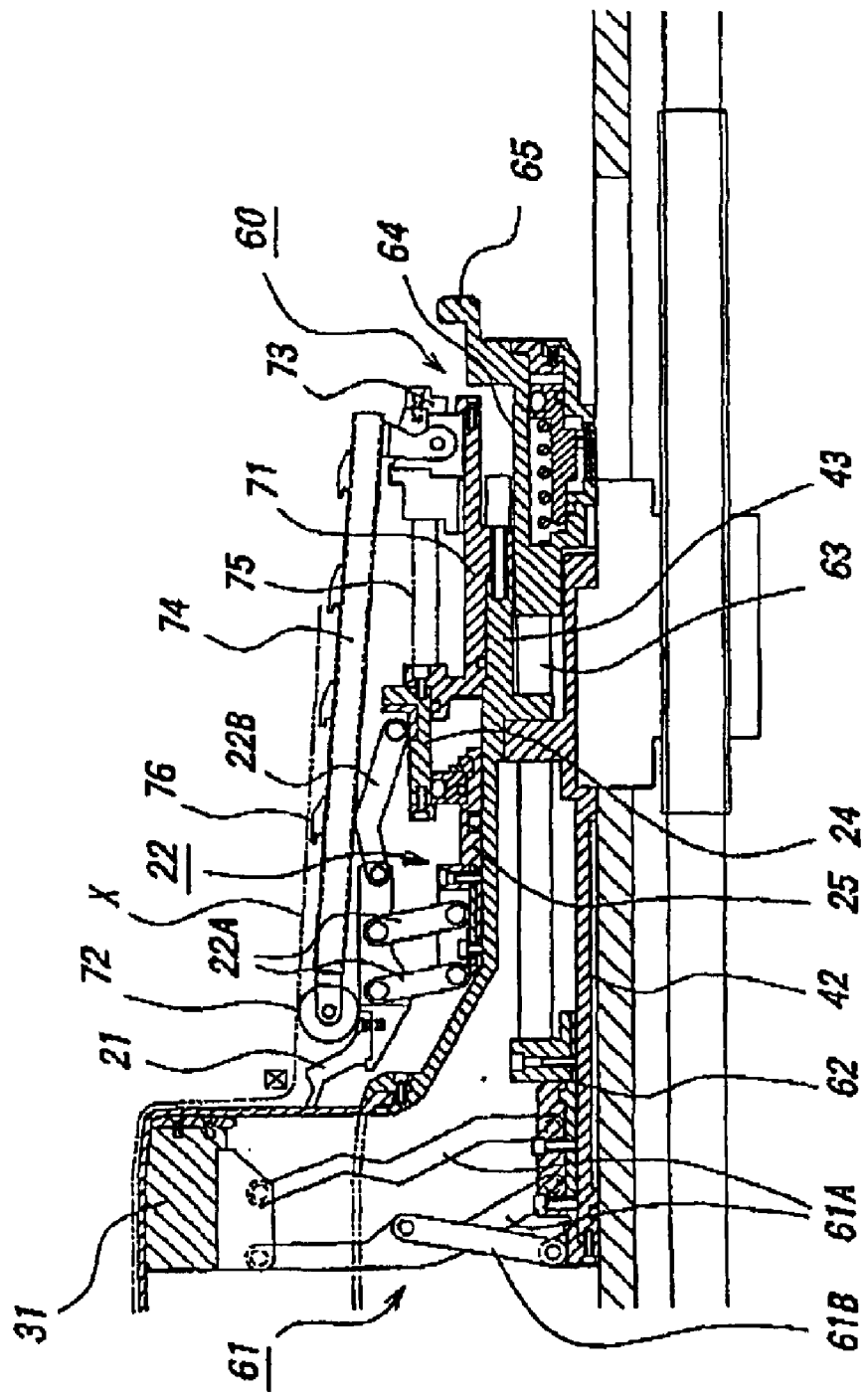
FIG. 4 is a partially sectional fragmentary detail view of a tire building drum according to the present invention.
Figure 5:
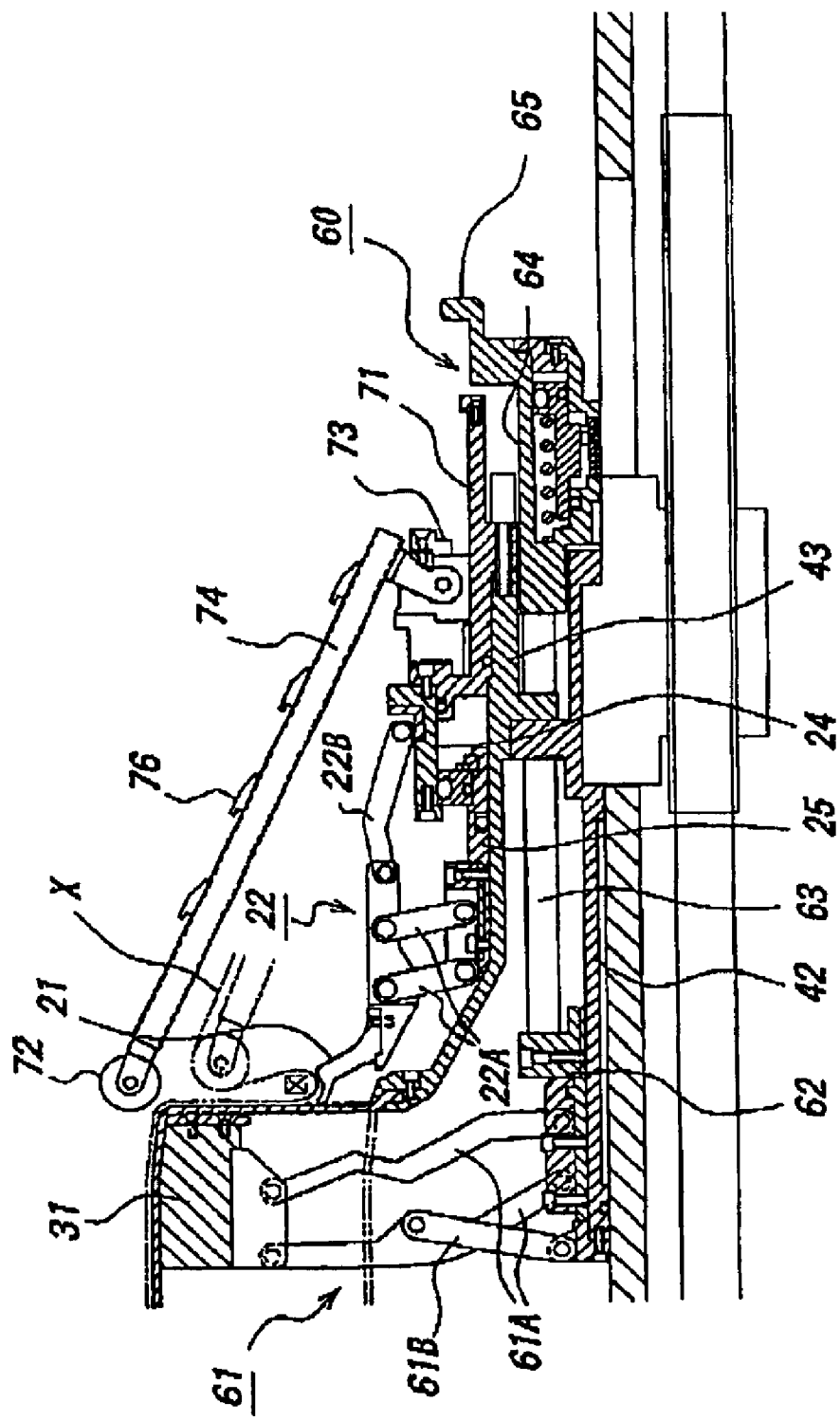
FIG. 5 is a partially sectional fragmentary detail view of a tire building drum according to the present invention.

FIGS. 2 to 5 are partially sectional fragmentary detail views each showing details of the slider 40, the segment-expanding/contracting mechanism 60, the bead lock section 20, and the turn-up mechanism 70 at different states of the tire building drum. With reference to these figures, each section is described below in detail. While FIG. 2 shows a state where the slider 40 lies axially outside, FIGS. 3 to 5 show states where the slider 40 has moved to the axially central side.

Each segment-expanding/contracting means 60 for expanding/contracting segments 31 has segment-expanding/contracting link sections 61 which are joined to the segments 31, is circularly arranged and expands or contracts the segments 31, a segment-binding section 62 which binds the segment-expanding/contracting link sections 61 and axially slides on the slider guide section 42, a break 64 connected to the segment-binding section 62 via a connecting rod 63, and a segment driving connector 65 which is attached to the break 64 and is capable of engaging with the above-mentioned driving arm 5C.

Each segment-expanding/contracting link section 61 is provided with a pair of parallel links 61A which are pivotly connected to pins attached the segment-binding sections 62 and pins connected to the segments 31 at both ends to swing in parallel with each other, as well as each has a swing link 61B which is pivotly connected a pin attached to one of the parallel links 61A and a pin fixedly provided on the slider guide section 62 at both ends.

When the break 64 is released and the driving arm 5C of the tire building apparatus 2 is engaged with the segment driving connector 65 to move the driving arm 5C in the axially center direction in the state as shown in FIG. 3, the break 64, the connection rod 63 and the segment-binding section 62 integratedly move in the axially inward direction to be the state as shown in FIG. 4. Practically, when the main body of the carcass member is swelled, in order to move the segments 31 in the axially center direction while being radially expanded, the segment-binding sections 62 are moved in the axially center direction by a distance larger than that of the slider guide section 42 of the slider 40 which is also moved in the axially center direction. That is, by relatively moving the segment binding sections 62 in the axially center direction further than the slider guide section 42, the swing pin 61B pivotly connected to the to the slider guide section 42 and the pair of parallel pins 61A are cooperatively moved so that the segments 31 can be radially expanded while maintaining their positions.

Additional description of the break 64 is made here. The break 64 constituting the segment-expanding/contraction means 60 act to keep the radial positions of the segments 31 against contractive force of the center bladder 45 and force which radially contracts the segments when a tension is applied to the outer periphery of the center bladder 45 to bond the belt members.

Figure 7:
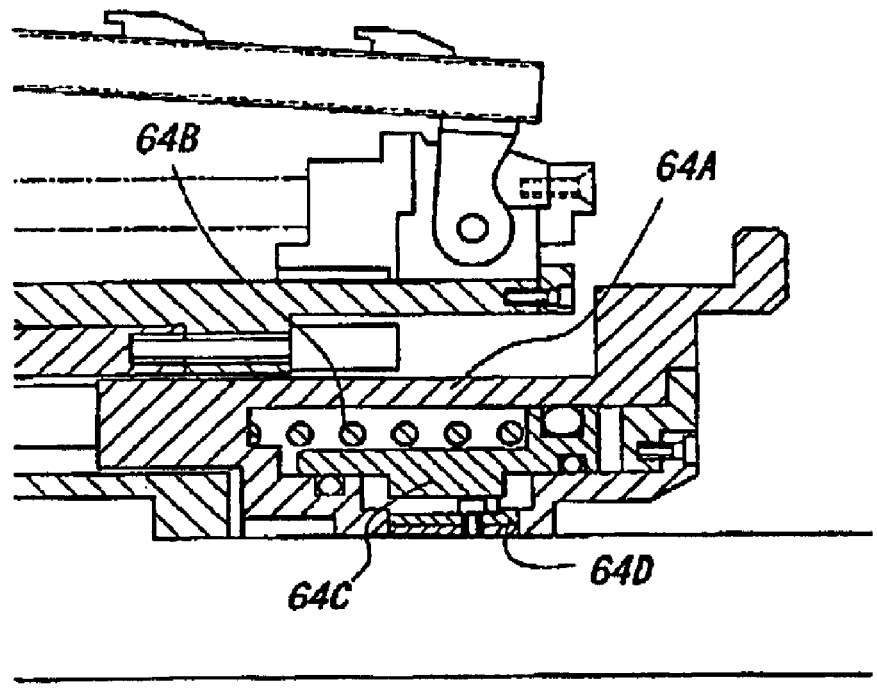
FIG. 7 is a sectional view showing a break.

As shown in FIG. 7, the break 64 has a cylinder 64A for including air, a taper piston having a corn-like taper section and reciprocating in the cylinder 64A, pressure springs 64B mounted in an air chamber located in the axially center direction from the taper piston 64C, and a taper ring 64D of which the outer surface is engaged with the corn-like taper section of the taper piston 64C and a break metal to be slid on the main shaft 10 is fixedly attached on the inner surface.

By means of pressurization of the air chamber in the axially center side from the taper piston 64C, and by virtue of function of the pressure springs, the taper piston 64C is moved in the axially outward direction, and, therefore, the taper ring 64D is clamped via the taper surface to break against the radial contraction of the segments 31. On the contrary, by pressuring the air chamber in the axially outward side, the taper ring 64D is released from clamping to enable the segments 31 to be radially expanded or contracted.

Next, a bead lock section 20 is described. The bead lock section 20 has a bead lock segments 21 circumferentially abutting on each other and being radially expansible or contractible, bead lock expanding/contracting link sections 22 joined to the bead lock segments 21, axially movable bead lock binding sections 25 joined to these link sections 22, and a bead lock cylinder 24 which moves the bead lock binding sections 25 and is fixedly connected to the bead lock section-supporting section 43.

The bead lock expanding/contracting link section 22 is provided with a pair of parallel links 22A of which both ends are pivotly connected to the bead lock segment 21 and the bead lock binding section 25, respectively, and a swing link 22B of which both ends are pivotly connected to bead lock segment 21 and the bead lock cylinder 24.

When the inside of the bead lock cylinder 24 is pressurized to move the bead lock binding section 25 from the position as shown in FIG. 2 toward the axially center direction, each of the bead lock sections 21 can be axially expanded by the action of the parallel links 22A and the swing link 22B while maintaining their positions, as shown in FIG. 3. Contrary, when the inside of the bead lock cylinder 24 is depressurized to move the bead lock binding section 25 toward the axially outer direction, each of the bead lock sections 21 can be axially contracted via the bead lock expanding/contracting link section 22.

Next, a pair of left and right turn-up mechanisms 70 is described. Each of the turn-up mechanisms 70 has a base section 71 fixedly connected to the bead lock section-supporting section 43 of the slider 40, a plurality of turn-up roller 72 circumferentially abutting on each other and being radially expansible or contractible, an external roller-driving contact section swung on the base section 71 to reciprocate by contacting an axially reciprocating external driving arm 5C, turn-up fingers 74 having one end connected to the turn-up roller 72 and the other end pivotly connected to the external roller driving contact section 73, a return spring 75 of which both ends are engaged with the base section and the external roller driving contact section 73, and a plurality of rubber bands 76 fixedly provided on the outer circumference of the turn-up fingers 74.

In FIG. 4, a turn-up section X of a carcass band composed of the side part of the carcass member and an optional side wall rubber is provided on a outer circumference formed by the circularly arranged turn-up fingers 74. The turn-up section X is turned up by radially expanding the turn-up fingers 74 and the expanding/contracting roller 72 connected to the fingers 74. That is, when the arm 5C is contacted the external roller driving contact section 73 to move it in the axially center direction, the external roller driving contact section 73 is moved along the base section 71 in the axially center direction and the turn-up fingers 74 pivotly connected to the external roller driving contact section 73 and the turn-up roller 72 are also moved in the axially center direction, as shown in FIG. 5. However, since the turn-up roller 72 is restricted its movement in the axially center direction by the center bladder 45 which holds the turn-up section X and is radially expanded, the turn-up fingers 74 and the expanding/contracting roller 72 are radially expanded with the point pivotly connecting them to the external roller driving contact section 73 as the center, thereby turning up the turn-up section X.

In order to radially contract the turn-up roller 72 and the turn-up fingers 74 after they are radially expanded to turn up the turn-up section X, the external roller driving contact section 73 is moved in the axially outside direction by the action of the return spring 75, as well as the turn-up fingers 74 are radially contracted by the action of the rubber bands 76.

Figure 8:
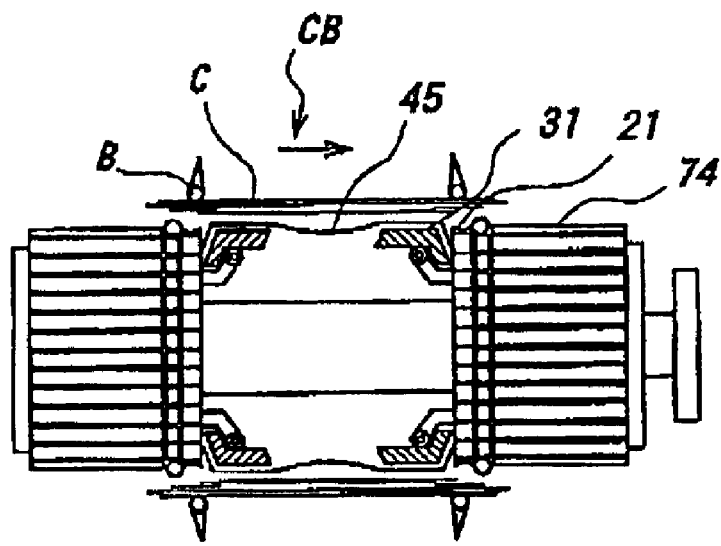
FIG. 8 is a partially sectional schematic diagram of the drum showing a procedure of building.
Figure 9:
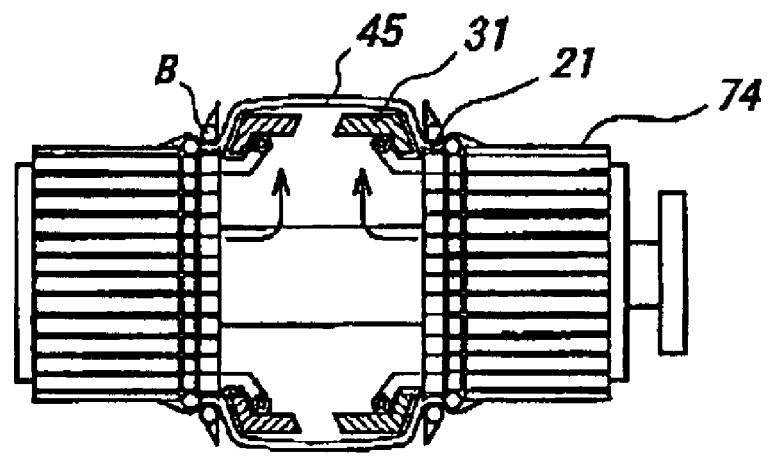
FIG. 9 is a partially sectional schematic diagram of the drum showing a procedure of building.
Figure 10:
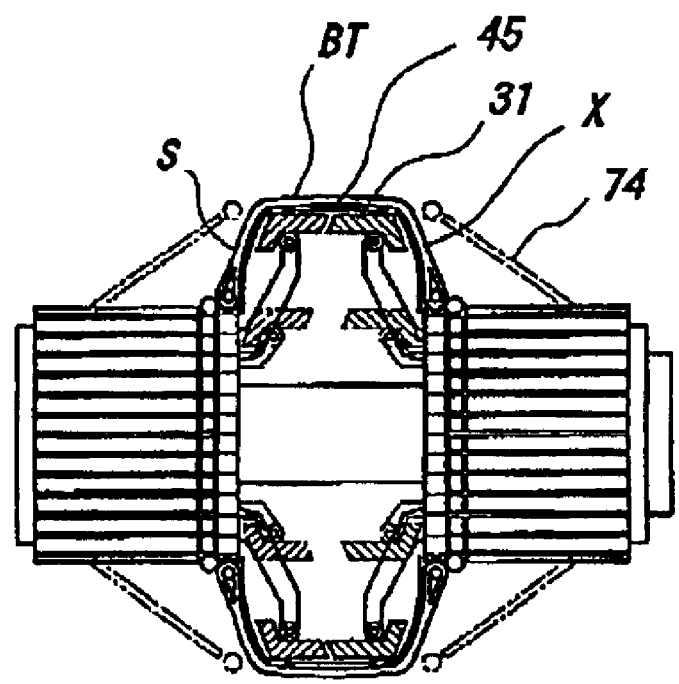
FIG. 10 is a partially sectional schematic diagram of the drum showing a procedure of building.

Next, a procedure of building a green tire with the tire building drum 1 is described with reference to the partially sectional front views of the drum as shown in FIGS. 8 to 10. A carcass band CB built on another drum and including carcass members C and bead cores B is transferred on the outer circumference of the tire building drum 1 in the state where the segments 31, the bead lock segments 21 and the turn-up fingers 74 of the tire building drum 1 are radially contracted, as shown in FIG. 8. In this case, the distance between the bead lock segments 21 of the bead lock section 20 is set according to the distance between both bead cores B of the carcass band CB.

Subsequently, as shown in FIG. 9, the bead lock segments 21 are radially expanded to hold the bead cores B. Then, the segments 31 and the center bladder 45 are radially expanded while the axial distance between the bead lock sections 20 being narrowed. In this context, in order not to act unnecessary contracting force on the segments 31 and to apply tension uniformly on the center bladder, the inner pressure is delicately adjusted according to the diameter of the center bladder.

Afterwards, as shown in FIG. 10, the segment 31 and the center bladder 45 are radially expanded to a given maximum diameter according to the size of the tire. Then, the turn-up section X is turned up by radially expanding the turn-up fingers 74 with moving it in the axially center direction. Belt members and a tread rubber are bonded on the outer circumference of the expanded carcass members. Plural rows of sidewall rubber having a ribbon-like shape are wrapped around the side part of the tire to from a side wall having a given sectional shape. Finally, a stitching operation is performed on it and the green tire is completed. Thereafter, the turn-up finger 74, the center bladder 45, the segment 31 and the bead lock segment are radially contracted to remove the green tire.

As having been clearly shown in the above description, according to the present invention, since, in a tire building drum for building a green tire by radially expanding a carcass band or carcass members between bead cores of a green tire to form a troidal shape, a carcass supporting bodies is composed of a pair of core bodies arranged on the left and right sides of a main shaft, and there are provided sliders which is equipped with these core bodies and the bead lock sections and move toward and away from each other in the axial direction, and the slider-moving means for moving these sliders to and stopping at any required radial position, a green tire having any bead core distance and belt members of any width can be produced without replacing any part including the segments but only with changing settings of positions of the sliders to be stopped according to the dimension of the tire to be built.

In addition, each of the core bodies on the both sides is composed of the plurality of expansible/contractible segments circumferentially abutting on and engaged with each other, and there are provided on the both sides the segment-expanding/contracting means for radially expanding the segments to and stopped at any diameter. Therefore, a green tire having belt members of any inner diameter can be built without replacing any part including a segment but only with changing a setting of a position of the segment expanding/contracting means to be stopped according to the dimension of the tire to be built.

While the preferred embodiments of the present invention have been described, it is to be understood that modifications and variations may be made without departing from the scope of the invention as defined by the appended claims.

What is claimed is:

1. A tire building drum comprising a hollow main shaft, a pair of bead lock sections arranged concentric with the main shaft and respectively for holding a bead core of a tire, and a radially expansible/contractible carcass-supporting body defining an inner shape of a carcass member extending between the bead cores, the tire building drum further comprising:

a pair of care bodies concentric with the main shaft, said pair of core bodies constituting the carcass-supporting body and comprising a plurality of expansible/contractible rigid segments circumferentially abutting on and engaging with each other, a pair of sliders, each slider having one core body and one bead lock section mounted thereon, said sliders being movable toward and away from each other in the axial direction;

slider-moving means for moving these sliders to any required axial position; and segment-expanding/contracting means for expanding/contracting the segments of each core body to any required radial position; wherein said segment-expanding/contracting means comprises segment-expanding/contracting link sections joined to the segments, a segment-driving connector joined to a driving arm axially reciprocated by a servo motor, an axially movable segment-binding section for coupling the segment-expanding/contracting link sections to the segment-driving connector, and a break for breaking the segment-binding section, said segment-binding section being movable in an axially center direction by a distance larger than that of the slider guide section of the slider that is also movable in the axially center direction.

2. The tire building drum according to claim 1, wherein said slider-moving means comprises a screw shaft provided in the hollow main shaft, said screw shaft comprising a slider-driving connector joined to an output shaft of a servo motor, and a pair of thread sections screwed into the sliders and having mutually opposite leads.

3. The tire building drum according to claim 1, wherein said bead lock sections each comprises a plurality of bead lock segments circumferentially abutting on each other and being radially expansible or contractible while maintaining their circular spatial relations, bead lock expanding/contracting link sections joined to the bead lock segments, axially movable bead lock binding sections joined to these link sections, and a bead lock cylinder for moving the bead lock binding sections.

4. The tire building drum according to claim 1, further comprising a center bladder comprising an elastically deformable body for sealing spaces between the sliders including the core body, said bladder having both axial ends mounted to the sliders.

5. The tire building drum according to claim 2, further comprising turn-up mechanisms for turning side portions of the carcass member up about the respective bead cores, said turn-up mechanisms being mounted on each of the sliders.

6. The tire building drum according to claim 5, wherein said turn-up mechanisms each comprises a plurality of turn-up rollers circumferentially abutting on each other and being radially expansible or contractible while maintaining their circular spatial relations, an external roller-driving contact section that can be reciprocated by contacting an axially reciprocating external driving arm, and rigid turn-up fingers, said fingers each having one end connected to the turn-up roller and the other end pivotly connected to the external roller-driving contact section.

* * * * *